June 28, 1960

J C. MILLS 2,942,399

STALK GATHERING ATTACHMENT FOR COMBINES

Filed Feb. 24, 1958

J C Mills
INVENTOR.

BY *Clarence A.O'Brien*
*and Harvey B. Jacobson*
Attorneys

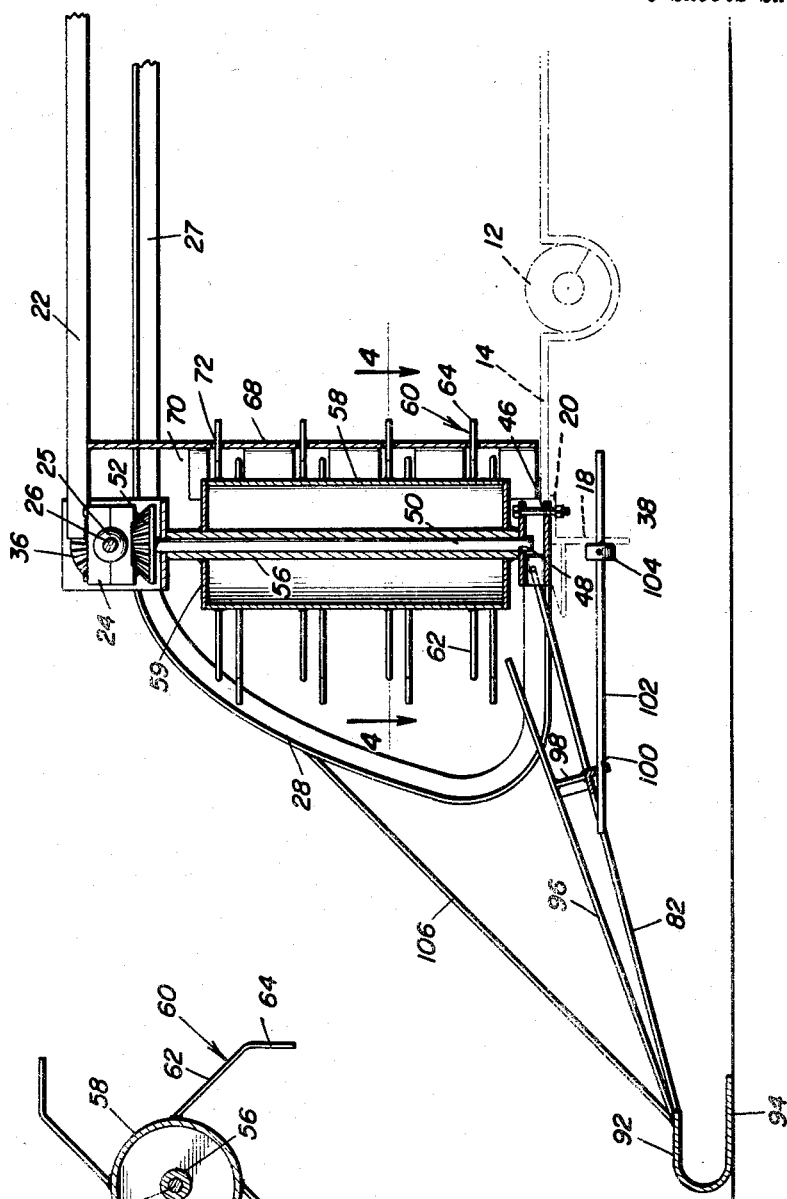
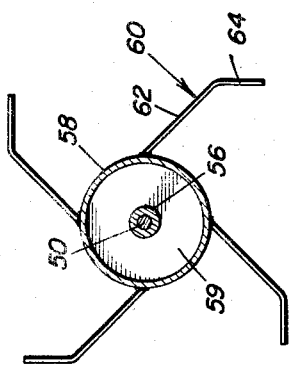

June 28, 1960 J C. MILLS 2,942,399
STALK GATHERING ATTACHMENT FOR COMBINES
Filed Feb. 24, 1958 3 Sheets-Sheet 3
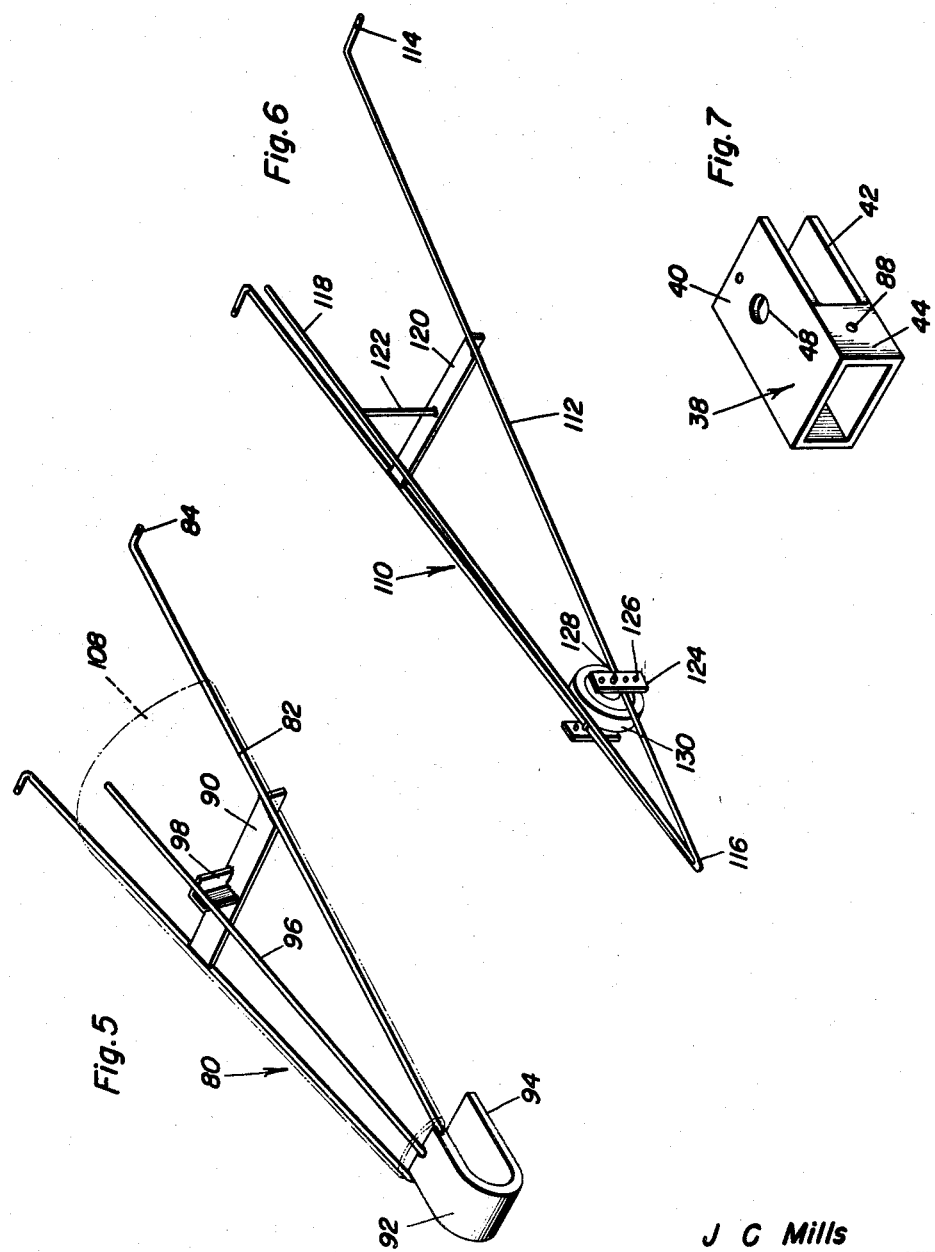
J C Mills
INVENTOR.

United States Patent Office 2,942,399
Patented June 28, 1960

2,942,399

STALK GATHERING ATTACHMENT FOR COMBINES

J C. Mills, P.O. Box 726, Abernathy, Tex.

Filed Feb. 24, 1958, Ser. No. 717,046

7 Claims. (Cl. 56—169)

The present invention generally relates to agricultural implements and more particularly to a harvester such as a combine and incorporates an attachment for a combine.

Combines are normally provided with a horizontally disposed cutter bar arrangement along with a conveyor arranged behind the cutter bar for receiving the grain as it is cut by the cutter bar and conveying the same into the threshing equipment. There is normally provided an enlarged reel rotatable about a horizontal axis disposed in overlying relation to the cutter bar with the reel having a plurality of circumferentially spaced paddles for urging the grain and guiding the grain into the cutter bar. While the reel is satisfactory in connection with certain types of crops such as wheat, rye, oats and the like, this reel does not accomplish the desired results on other types of grain such as maize and heiger and the like since it tends to knock a considerable quantity of grain onto the ground. Thus, it is the primary object of the present invention to provide an attachment for a combine which replaces the conventional reel and especially adapts the combine for use in harvesting maize, heiger, soyabeans or the like.

Another object of the present invention is to provide a combine attachment which incorporates a plurality of pairs of rotatable cylindrical disks mounted vertically in overlying relation to the cutter bar with each of the drums having projecting tines or teeth thereon for picking out the grain and passing it therebetween for bringing the grain into engagement with the cutter bar and subsequently discharging the grain onto a conveyor.

A further important feature of the present invention is to provide an attachment in accordance with the preceding object in which stripper plates are provided for removing the grain from the tines.

Yet another object of the present invention is to provide a combine attachment which includes a forwardly and downwardly projecting grain guide and lifting mechanism for lifting the grain into the area between the pairs of rollers.

Other objects of the present invention will reside in its simplicity of construction, ease of attachment to conventional combine and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged detailed sectional view taken substantially upon a plane passing along section line 3—3 of Figure 2;

Figure 4 is a detailed sectional view taken substantially upon a plane passing along section line 4—4 of Figure 3 illustrating further structural details of one of the cylindrical drums;

Figure 5 is a perspective view of one of the grain lifting guides;

Figure 6 is a perspective view of a modified form of grain lifter and guide; and Figure 7 is an enlarged perspective view illustrating a bracket for supporting the rotatable drums and the grain lifter.

Figures 1, 2:
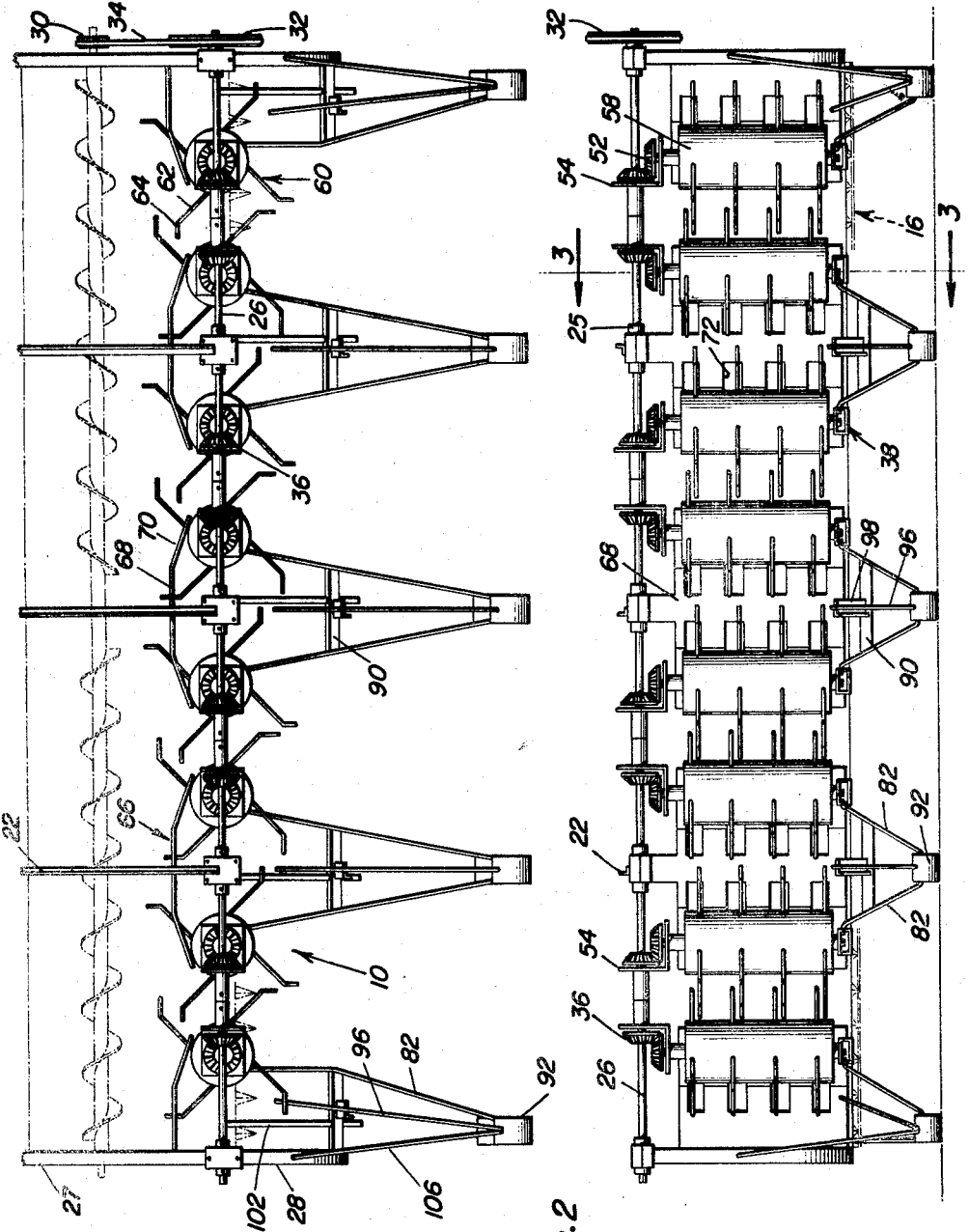
Figure 1 is a plan view of the front part of a combine with portions shown in phantom and illustrating the attachment of the present invention.
Figure 2 is a front elevational view of the construction of Figure 1.

Referring now specifically to the drawings, the numeral 10 generally designates the attachment of the present invention with the attachment being shown in detail and which may be mounted on various types of combines with very little modification.

The only structure of the combine is shown in phantom and generally includes a transverse screw auger conveyor 12 along with a bottom plate 14 which provides a surface area for receiving the grain from the cutter bar assembly designated by the numeral 16 which includes a depending plate 18 and a horizontal rearwardly extending plate 20 all of which is generally conventional construction.

Projecting forwardly from the combine and secured thereto by any suitable means is a plurality of parallel rods or braces 22 each of which are attached to a bearing support 24 with wooden collars 25 journaling an elongated sectional drive shaft 26. The end bearing blocks 24 are supported by support members 26 below the support members 22 and the support members 26 terminate in downwardly and reversely curved portions 28 which form an end guide and end limitation to the attachment. The support members 22 and 26 extend perpendicular to the transverse conveyors 12 which convey the grain to the center of the combine. The conveyor shaft is provided with a drive pulley 30 in alignment with an enlarged drive pulley 32 on the end of the sectional drive shaft 26 with their being an endless belt 34 encircling the pulleys 30 and 32 for driving the shaft 26. The sectional drive shaft 26 is provided with a plurality of bevel gears 36 mounted thereon with the bevel gears arranged in alternating facing relation whereby all of the gears 36 turn in the same direction but the gears are arranged alternatingly on the shaft 26.

Mounted on the horizontal plate 20 is a plurality of generally U-shaped brackets designated generally by reference numeral 38 which includes spaced parallel upper and lower walls 40 and 42 which are interconnected by partial side walls 44. Fastening bolts 46 are used to mount the brackets 38 in position and the upper wall 40 is provided with an enlarged opening 48 with sealed bearings for receiving the lower end of an elongated shaft 50. The elongated shaft 50 has a bevel gear 52 on the upper end thereof in meshing engagement with the bevel gear 36 on the shaft 26. Each of the bevel gears 36 on the shaft 26 is in meshing engagement with the corresponding bevel gear 52 thus driving the shafts 50 in alternating rotational directions with the adjacent shafts being driven in opposite directions. An L-shaped member 54 interconnects each of the shafts 50 and the shaft 26 for retaining the same in proper orientated relation. Rotatably mounted in relation to the combine is a tubular member 46 rigid with the shaft 50 which rests against the undersurface of the upper wall 40. The tubular member 56 has a cylindrical drum 58 held rigid therewith in concentric spaced relation by end plates 59. Extending outwardly from the drum 58 is a plurality of radially disposed tines 60 which are welded to the peripheral wall of the drum 58 and including a portion extending angularly in relation to the radius as designated by the numeral 62 with the free end thereof extending angularly at a greater angle as designated by the numeral 64. Thus, the included angle between an imaginary radius and the angulated portion 62 will be acute whereas the angulated portion 64 is generally parallel to a tangent through the point of attachment of the tine or projection 60 to the drum 58.

The tines or projections 60 mounted on adjacent drums 58 are at different elevations and are of such a length that they overlap each other when rotating and the angulated portions 62 and 64 are formed oppositely. Inasmuch as adjacent drums 58 rotate in opposite directions, the adjacent drums 58 will rotate towards each other for gathering grain or plants disposed forwardly of the cutter bar 16 thus urging the grain into the cutter bar whereby the cutter may effectively sever the grain so that the same may be discharged onto the plate 14 and into the conveyor 12.

Mounted rearwardly of each of the drums 58 is a stripper plate generally designated by the numeral 66 which includes a vertical portion 68 and forwardly angulated portion 70 with the plates 66 being provided with slots 72 for receiving the tines 60 and stripping grain therefrom. The angulated portion 70 extends substantially tangentially to the drums 58 and will effectively strip material from the tines 60 during rotation thereof.

Mounted forwardly of the attachment is a plurality of pick-up devices generally designated by the numeral 80 which includes a pair of rearwardly diverging rods 82 having outturned ends 84 for pivotal engagement with a pair of apertures 86 in the partial side walls 44 of the brackets 38. The rods 82 are retained rigid by a transverse brace member 90 intermediate the ends with the front ends of the rods 82 being rigidly attached to a U-shaped skid member 92 having the lower end thereof which forms the lower leg designated by the numeral 94 longer than the upper leg and engaging the ground surface. Extending between the rods 82 is a top rod 96 which extends in diverging relation to the plane of the rods 82 and is held in this position by an upstanding member 98 on the brace 90 whereby the rod 96 acts as a pick up and guide for grain thus deflecting grain or plants into the area between adjacent pairs of drums. The depending leg of the transverse brace 90 is provided with an aperture 100 receiving an elongated rod 102 which extends through an aperture in the depending plate 18 and a stop collar 104 is adjustable on the rod 102 whereby the angular position of the pick-up 80 may be varied by varying the position of the stop collar 104 on the rod 102. The outermost of the pick-ups are provided with upwardly inclined braces 106 which interconnect the downwardly and rearwardly curved portion 28 with the skid member 92 thus effectively forming a swath board for defining the cut of the combine.

As illustrated in Figure 5, a generally U-shaped cover 108 is provided which is shown in phantom and which is slidably engaged with the rods 82 for mounting thereon for more effectively lifting and guiding grain into the area between adjacent drums for further facilitating the lifting of certain types of grains.

Figure 6 illustrates a modified form of pick-up generally designated by the numeral 110 which includes a pair of diverging rods 112 having outturned ends 114 for mounting on the brackets 40 in the same manner as the pick-up 80. The forward end of the rods 112 are joined at their apex designated by the numeral 116 and an upwardly inclined rod 118 is connected to the apex 116. A transverse brace 120 extends between rods 112 and an upstanding rod 122 supports the rod 118 from the transverse brace 120. For varying the elevational position of the front end of the pick-up 110, there is provided a pair of vertically disposed plates 124 each having a plurality of vertically spaced apertures 126 for receiving a transverse axle 128 having a ground engaging depth wheel 130 thereon whereby the axle 128 may be positioned in any of the selective apertures 126 for varying the elevation of the pick-up attachment 110 by raising and lowering the effective height of the depth wheel 130.

In the form of the invention illustrated, the attachment is placed on the header of a combine and includes eight cylindrical drums with the projecting teeth or tines attached thereto with the shields or stripper plates placed behind the cylindrical drums. This shield or stripper plate knocks the grain loose from the teeth on the drum thus precluding rotation of the grain completely around the drum. The pick-up attachment which extends in front of the header bar effectively lifts any grain which may be bent over or partially fallen. The attachment replaces the customary reel on a combine and substantially eliminates all waste in combining maize, heiger and similar material such as occurs when a reel type combine is normally employed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a combine having an elongated transverse extending cutter bar assembly with a transverse conveyor disposed rearwardly thereof, an attachment comprising a plurality of vertically disposed cylindrical drums, means mounting said drums on the combine above and forwardly of the cutter bar assembly for rotation about a vertical axis, a plurality of projecting rod-like angulated tines on each of said drums, said drums being arranged in pairs with the drums of each pair being driven in opposite directions with the tines overlapping for a major portion of their length for carrying stalks between the drums of each pair and into engagement with the cutter bar assembly, means mounted on the combine and disposed rearwardly of the drums for stripping the material from the tines thereby depositing the material rearwardly onto the conveyor, and means pivotally supported from the cutter bar assembly and extending forwardly and downwardly from the cutter bar assembly for lifting material for passage between the drums, said means being disposed intermediate the pairs of drums for urging material laterally for passage of the material between the drums of the pairs.

2. The combination of claim 1 wherein said means extending forwardly and downwardly from the cutter bar includes a plurality of converging rods, ground engaging means mounted on said rods for maintaining a predetermined height above the ground surface, said rods being mounted for free vertical swinging movement whereby variations in elevation of the ground being traversed by the ground engaging means will swing the rods in a vertical plane, each pair of drums having a converging rod assembly for lifting the grain to the area between the drums for movement therethrough.

3. The combination of claim 2 wherein said ground engaging means includes a U-shaped skid rigid with the forward end of the rods with the skid having the lower leg thereof engaging the ground surface.

4. The combination of claim 2 wherein said ground engaging means includes a rotatable wheel mounted adjacent the front end of said rods, and means mounting said wheel on the rods for vertical adjustment on said rods for varying the elevational relationship between the bottom peripheral edge of the wheel and the apex formed by the juncture between the converging rods.

5. The combination of claim 2 wherein means is provided interconnecting the converging rods and the cutter bar assembly for limiting the downward swinging movement of the rods for permitting elevation change of the cutter bar assembly in relation to the ground engaging means and elevation of the ground engaging means for transportation of the combine when the cutter bar assembly is raised above a predetermined point.

6. The combination of claim 2 wherein said stripping means includes a vertically disposed plate member disposed substantially completely rearwardly of each pair of drums and including vertical side edge portions disposed substantially tangential to a rearward portion of the periphery of the drums thereby leaving the forward portion of the periphery of the drums free of obstructions, the side edges of said plate having slots for receiving the tines whereby material carried by the tines will be stripped from the tines and drop onto the conveyor.

7. An attachment for a harvester having a horizontally disposed cutter bar assembly disposed in adjacent relation to the ground surface and having a conveyor disposed behind the cutter bar assembly, said attachment comprising a plurality of pairs of generally vertically disposed drum members adapted to be mounted on the harvester for rotation about vertical axes, means connected to said drums for rotation thereof, each of said drums having a plurality of projecting rod-like tines thereon for engaging material and forcing the material between the adjacent oppositely rotating drums of each pair, means adapted to be mounted on the harvester rearwardly of the drums and having means disposed substantially tangentially in relation to the periphery of the drums for stripping material from the tines during rotation of the drums towards the edges of the last said means, said edges of the last named means being slotted for permitting passage of the tines, and means adapted to be connected to the harvester and extending forwardly intermediate the pairs of drums for guiding the material upwardly and laterally between the drums of each pair.

References Cited in the file of this patent

UNITED STATES PATENTS

| | | |
|---|---|---|
| 2,188,522 | Alfs | Jan. 30, 1940 |
| 2,576,122 | Kenison | Nov. 27, 1951 |
| 2,777,267 | Thompson | Jan. 15, 1957 |